(12) United States Patent
Rösgen et al.

(10) Patent No.: US 8,388,834 B2
(45) Date of Patent: Mar. 5, 2013

(54) FUEL FILTER

(75) Inventors: André Rösgen, Remshalden (DE); Martin Klein, Stuttgart (DE)

(73) Assignee: Mann+Hummel GmbH, Ludwigsburg (DE)

( * ) Notice: Subject to any disclaimer, the term of this patent is extended or adjusted under 35 U.S.C. 154(b) by 757 days.

(21) Appl. No.: 12/519,412

(22) PCT Filed: Dec. 21, 2007

(86) PCT No.: PCT/EP2007/064488
§ 371 (c)(1), (2), (4) Date: Nov. 4, 2009

(87) PCT Pub. No.: WO2008/077954
PCT Pub. Date: Jul. 3, 2008

(65) Prior Publication Data
US 2010/0101984 A1 Apr. 29, 2010

(30) Foreign Application Priority Data
Dec. 23, 2006 (DE) .................. 20 2006 019 301 U

(51) Int. Cl.
*B01D 29/88* (2006.01)
*B01D 29/54* (2006.01)
*B01D 35/153* (2006.01)

(52) U.S. Cl. .......... 210/117; 210/86; 210/104; 210/136; 210/266; 210/299; 210/307; 210/314; 210/337; 210/416.4; 210/456

(58) Field of Classification Search ............ 210/86, 210/104, 112–115, 175, 182, 184, 257.1, 210/265, 266, 298, 299, 302–307, 309, 312–319, 210/337, 338, 136, 258, 117, 254, 456
See application file for complete search history.

(56) References Cited

U.S. PATENT DOCUMENTS

| 2,742,156 | A | * | 4/1956 | Spangler ........................ 210/115 |
| 3,622,004 | A | * | 11/1971 | Meyer ........................... 210/134 |
| 4,136,009 | A | * | 1/1979 | Samiran ........................ 210/114 |
| 4,372,847 | A | * | 2/1983 | Lewis ............................ 210/86 |
| 4,502,955 | A | * | 3/1985 | Schaupp ....................... 210/149 |
| 4,565,629 | A | * | 1/1986 | Wilson et al. ................. 210/248 |
| 4,618,423 | A | * | 10/1986 | Hodgkins ..................... 210/305 |
| 4,626,348 | A | * | 12/1986 | Stone ........................... 210/248 |
| 4,668,393 | A | * | 5/1987 | Stone ........................... 210/304 |

(Continued)

FOREIGN PATENT DOCUMENTS

| CA | 963400 A | 2/1975 |
| DE | 10123190 A1 | 11/2002 |

(Continued)

OTHER PUBLICATIONS

German patent office search report of DE 20 2006 019301.4. PCT search report of PCT/EP2007/064488.

*Primary Examiner* — Joseph Drodge

(57) ABSTRACT

The invention relates to a fuel filter (1) with a device for separating water from the fuel. This device comprises at least one filter screen element (6) placed in a filter housing (2) which is located downstream a filter element (3) for the filtration of particles from the fuel, a tank (15) located under the filter screen element (6) at the filter housing (2) in which the separated water droplets are collected, and a device for deviating the fuel between the filter element (3) and the filter screen element (6).

21 Claims, 2 Drawing Sheets

U.S. PATENT DOCUMENTS

| | | | |
|---|---|---|---|
| 4,680,110 A * | 7/1987 | Davis | 210/114 |
| 4,740,299 A | 4/1988 | Popoff | |
| 5,798,049 A * | 8/1998 | Proulx et al. | 210/767 |
| 5,833,765 A * | 11/1998 | Flynn et al. | 134/22.12 |
| 6,555,022 B2 * | 4/2003 | Hampden-Smith et al. | 252/301.4 R |
| 6,764,598 B2 * | 7/2004 | Yu et al. | 210/195.2 |
| 8,034,240 B2 * | 10/2011 | Reiland et al. | 210/299 |
| 2003/0121860 A1 | 7/2003 | Harenbrock et al. | |
| 2005/0029184 A1 * | 2/2005 | Desmarais | 210/437 |
| 2008/0135469 A1 * | 6/2008 | Fremont et al. | 210/234 |

FOREIGN PATENT DOCUMENTS

| | | |
|---|---|---|
| DE | 10138695 A1 | 2/2003 |
| DE | 10160497 A1 | 6/2003 |
| DE | 10350781 A1 | 7/2004 |
| EP | 0150120 A2 | 7/1985 |
| EP | 1229984 A1 | 8/2002 |
| FR | 2629876 A1 | 10/1989 |

* cited by examiner

FUEL FILTER

CROSS REFERENCE TO RELATED APPLICATIONS

This application is US National Stage Entry of international patent application no. PCT/EP2007/064488, filed Dec. 21, 2007 designating the United States of America, the entire disclosure of which is incorporated herein by reference. Priority is claimed based on Federal Republic of Germany patent application no. 20 2006 019301.4, filed Dec. 23, 2006, the entire disclosure of which is incorporated herein by reference.

TECHNICAL DOMAIN

The invention relates to a fuel filter with a device for separating water from the fuel, in particular Diesel fuel.

PRIOR ART

U.S. Pat. No. 4,740,299 discloses a fuel filter that features a collecting chamber in its housing for the water separated from the fuel which has an outlet for discharging the water. The outlet for discharging the collected water from the fuel filter is to be opened by means of a manually activated valve. This fuel filter allows only a limited separation of the water from the fuel, for the water emulsified in the fuel penetrates partially through the filter element together with the fuel and is then aspirated at the off-flow side by the prevailing vacuum together with the fuel to the internal combustion engine.

Therefore, the task of the invention is to create a fuel filter by means of which the degree of separation of the water emulsified in the fuel is enhanced.

This task is solved by a fuel filter with the features of claim 1.

DISCLOSURE OF THE INVENTION

The combination of features according to the invention makes it possible to separate particle filtration and water separation, the amount of water leaking in form of droplets being deposited directly into the tank located under the filter housing. The remaining quantity of water emulsified in the fuel comes in contact with the filter screen element together with the fuel where water pearls are generated which are deposited as droplets in the tank. Only a small amount of the water emulsified in the fuel reaches the filter screen element; this is also achieved because the device for the deviation of the fuel between the filter element and the filter screen element separates parts with larger mass mostly tangentially or centrifugally due to the strong change of direction.

It is deemed particularly appropriate that the device for the deviation comprises a housing insert which features in its lower part an opening that is located geodetically lower than the filter element. The structure of such a housing insert is very simple and does not require any additional space. The arrangement of the opening in the lower part leads to the fact that the fuel has to accept a very strong change of direction upwards, while the amount of water continues its downward movement due to its higher density. It is also advantageous that the filter screen element is basically made in a sleeve-shaped design while the housing insert is tubular, an annular chamber being formed between filter screen element and housing insert which is closed at its upper end. This design allows the filter screen element together with the housing insert to be positioned centrically inside the filter element. This has the advantage that—when replacing the filter element—the filter screen element is also inevitably replaced so that after each maintenance interval the full degree of separation of the filter element and the filter screen element is ensured. According to an appropriate embodiment the filter screen element comprises two units, one of which separates the water in the form of pearls while the other one is permeable to air. The filter screen element consists preferably of hydrophobic material, the mesh opening of which is between 5 µm and 500 µm. In particular, polyamide is suitable for this purpose. To ensure that the water is uniformly guided into the tank, guide plates are located in the lower part of the filter housing for the descending water droplets.

In another embodiment of the invention, a pump that can be switched on as needed, and a non-return valve located downstream the pump in the flow direction are positioned in the tank, the non-return valve featuring a specified opening pressure. According to the necessity, the water can be pumped out of the tank through the non-return valve. To determine easily when the water has to be pumped off a level sensor is provided. This means the pump works only if the level sensor indicates water in the tank. Detecting the lower level value ensures also that no fuel is pumped off and therefore cannot leak. This is also obtained by the fact that the valve closes as soon as the pump is switched off, thus excluding a further discharge of liquid.

Another advantage is that the valve and the pump are assembled to form one structural unit as this structural unit can be installed easily in the tank. To avoid that the separated water freezes when the ambient temperatures are low and thus allowing the water to be pumped off a heating device is preferably attached to the pump, with the heating device being capable of comprising a PTC element for an automatic regulation of the heating output.

According to an appropriate further development the tank is provided with an outlet connected to a catchment chamber which contains a substance that stores liquid. Thus, ingredients contained in the water such as hydrocarbons are absorbed by this substance, and the water evaporates while the hydrocarbons remain. A substance for storing the liquid is advantageously a filling of absorbent solids which could be easily removed from the device as needed and replaced by a fresh filling.

If the catchment chamber features an at least sectionally permeable wall the evaporated water can then pass through the wall and be collected therein. The wall may be made of fleece or diaphragm, forming a bag-like structure which can be arranged at the outlet of the tank. The evaporated water is free of dirt particles or pollutants which remain in the filling and after having passed through the permeable wall it can be collected for further use or discharged from the vehicle. The evaporated water condenses on the wall of the collecting tank where it is collected at the bottom and from where it can be removed through a temporarily opened drain hole of the collecting tank. A filling is arranged advantageously in a permeable wall in the catchment chamber which consists of a material that stores liquids. A large surface of the permeable wall of the filling of absorbent solids allows an optimal dissipation of the evaporated water vapors. A larger quantity of filling facilitates the evaporation. Furthermore, the evaporation process in the sponge-like filling can be favored by the installation of a heating device in the catchment chamber. In particular activated carbon, aluminum oxide or similar materials are suitable.

BRIEF DESCRIPTION OF THE DRAWINGS

An example of the embodiment of the invention is explained more in detail in the following by means of the drawings. Shown are in.

EMBODIMENT(S) OF THE INVENTION

Figure 1:
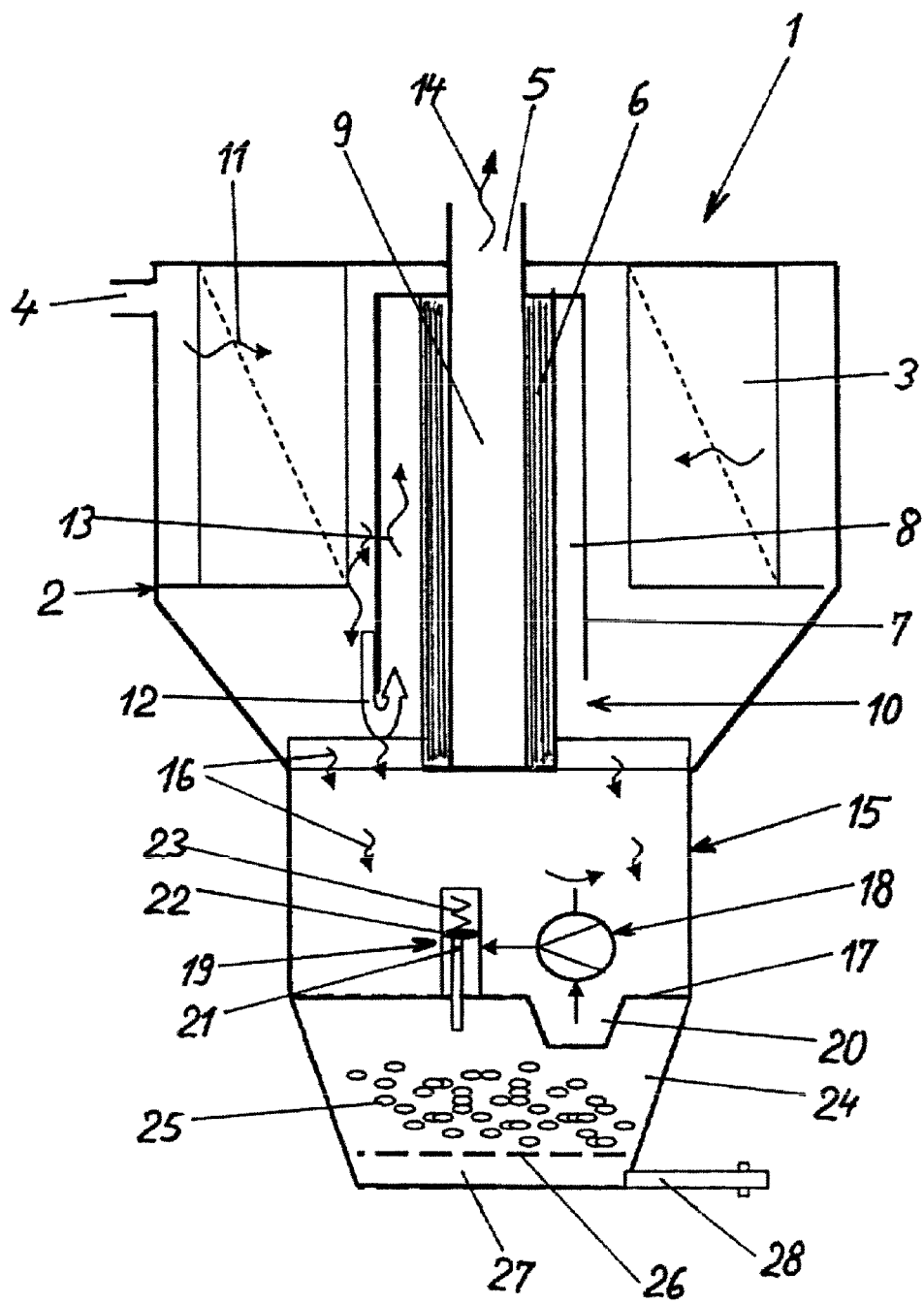
FIG. 1 a schematic representation of a fuel filter with a device for separating and discharging water from the fuel, FIG. 2 a more detailed representation of the device for discharging water from the tank, FIG. 3 a schematic representation of the electrical interconnection of each individual unit of the device according to FIG. 2.

FIG. 1 shows a fuel filter 1 which consists basically of a filter housing 2 with an intake connection 4 and a return flow connection 5 as well as a filter element 3 located in the flow path between these connections. Concentrically to the filter element 3 a housing insert 7 is arranged radially therein in which a filter screen element 6 is also located concentrically. Between the housing insert 7 and the filter screen element 6 an annular chamber 8 is located which is accessible via an opening 10 at the lower end of the housing insert 7. Radially inside of the filter screen element 6 an outlet chamber 9 is formed to which the return flow connection 5 is connected.

The fuel to be filtered passes through the intake connection 4 into the filter housing 2 and is guided through the filter element 3 according to arrow 11 where dirt particles are filtered out. The filtered fuel is then guided downwards in the filter housing 2, for the housing insert 7 has the opening 10 exclusively in its lower part. As shown by the arrow 12 the flow direction of the fuel is deviated by approximately 180° and guided upwards in the annular chamber 8 according to arrow 13. As a matter of course, the whole surface of the sleeve-shaped filter screen element 6 is available for the passage of the fuel through the filter screen element 6. The completely filtered fuel is now in the outlet chamber 9 from where it is aspirated through the return flow connection 5.

Fuel—and in particular Diesel fuel—contains usually a certain amount of water emulsified in the fuel. During the passage of the fuel through the filter element 3 a certain amount of the emulsified water leaks in the form of droplets at the clean side of the filter element 3, the droplets being guided downwards with the fuel flow in the filter housing 2. These droplets are deposited directly in a tank 15 under the filter housing 2. The extreme change of direction of the fuel according to arrow 12 causes the water amount still emulsified in the fuel to flow further downwards, for it is unable to follow the extreme deviation due to its higher density. The remaining quantity of water emulsified in the fuel comes in contact with the filter screen element 6 where water pearls are generated which are deposited as droplets in the tank 15.

The interior area of the tank 15 which is located under the filter housing 2 is filled with fuel. The water droplets separated from the fuel in the way as described above are deposited in the direction indicated by the arrow 16. As a consequence, a water layer separated from the fuel is formed at the bottom 17. The water can be discharged via an outlet 21 which is designed as outlet duct and can be opened by the non-return valve 19. The non-return valve 19 features a locking element 22 which can be lifted against the force of a compression spring 23 from the valve opening at the front end of the outlet duct 21. Upstream the outlet duct 21 closed by the valve 19, an electric pump 18 is connected which is activated if a certain water level in the tank 15 is reached. For this purpose, a recess 20 in the tank bottom 17 where the water is collected and which is emptied when a certain level is reached is appropriate. If the pump 18 is activated, its delivery pressure forces the valve shutoff element 22 against the reset force of the spring 23 and opens the valve 19. The non-return valve 19 is designed for an opening pressure ranging from 1 bar to 5 bar, preferably 3 bar, thus ensuring that an opening only occurs when the pump 18 is activated and an undesired leakage of liquid from the tank 15 is excluded.

The outlet duct 21 leads to a catchment chamber 24 connected to the tank 15 which contains a filling 25 of absorbent solids such as activated carbon or aluminum oxide. The water from the tank 15 is absorbed by the filling 25 like a sponge. As time goes by, the water evaporates preferably due to the supply of air or heat while pollutants such as hydrocarbons remain in the filling 25. The bottom of the catchment chamber 24 is designed as a permeable wall 26 which at the same time defines a collecting tank 27 made of impermeable material. The water evaporated from the filling 25 can penetrate the permeable wall and condenses in the connected collecting tank 27. The clean water collected in the collecting tank 27 can be reused as needed by discharging it through an openable outlet opening 28.

Figure 2:
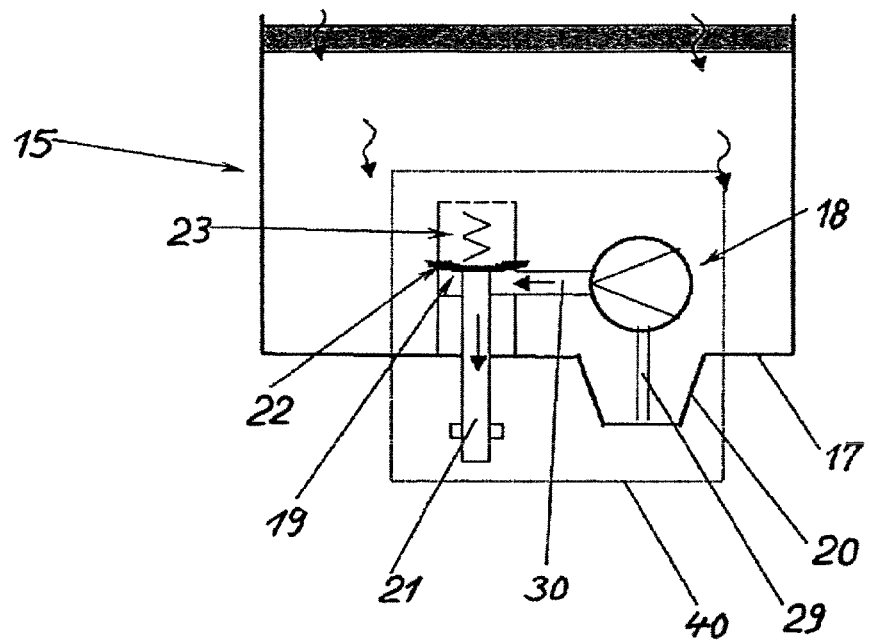

FIG. 2 shows a device provided for discharging the water from the tank 15 which discharges the excess water from the tank 15 through the outlet duct 21 by means of the pump 18. Instead of a pump it is also possible to use a valve which is opened for discharging the excess water. The pump 18 is positioned in the tank 15 and has a suction line 29 and a pressure line 30. The outlet duct 21 is closed by the non-return valve 19 which opens under the delivery pressure of the pump when the pump 18 is activated. For this purpose, the non-return valve 19 is equipped with a locking element 22 which can be lifted from the front edge of the outlet duct 21, the locking element 22 in the example of the embodiment being a diaphragm clamped at the edge which in case of pressurization is curved upwards, thus being able to open the front opening of the outlet duct 21. The valve spring 23 ensures that in case of decreasing pump pressure the diaphragm reaches the closing position of the valve 19. As soon as the pump 18 exerts a pressure on the valve shutoff element 21, it is displaced against the reset force of the valve spring 23 and the outlet duct 21 for discharging the water from the tank 15 is opened. The pump pressure is sufficient to exert an opening force on the surface of the valve shutoff element 22 if system pressures of >8 bar occur. The pump 18 is preferably activated when the internal combustion engine is deactivated. During this operating stage corresponding high system pressures can occur in the fuel supply system.

The pump 18 and the valve 19 are designed as a common structural unit 40 which is installed at the bottom 17 of the tank 15. The structural unit 40 can be a compact, for example cylindrical unit which can be integrated advantageously in the recess 20 of the tank bottom 17. The recess 20 of the tank bottom 17 can collect the water which is soon discharged automatically from the tank 15 by the pump 18.

Figure 3:
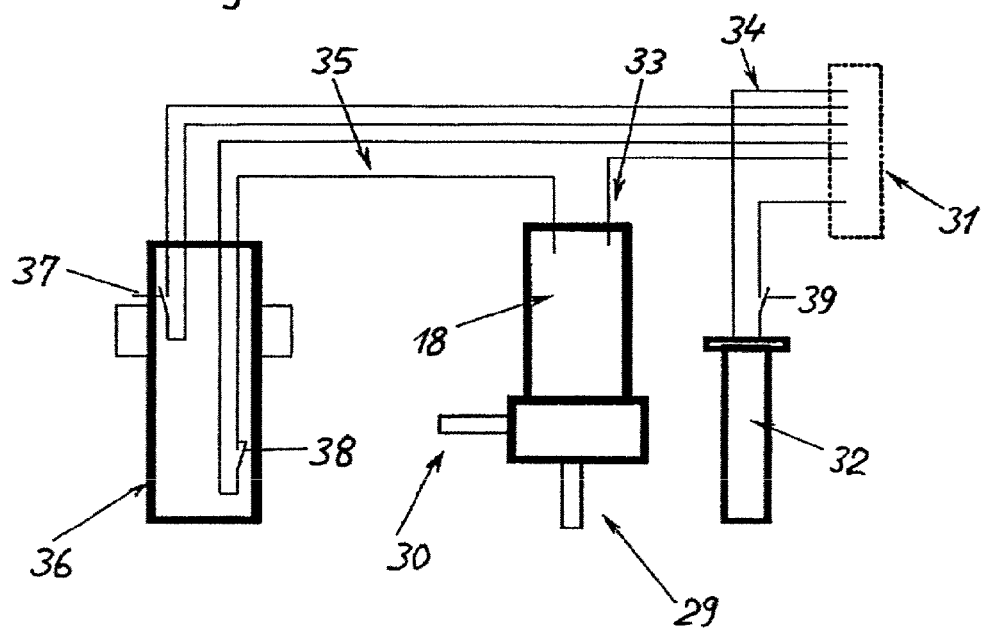

FIG. 3 shows a schematic representation of the electric wiring of the pump 18 and its operation. The pump 18 is fed by a control unit 31 and switched on and off via a control line 33, thus water is fed as needed via the suction line 29 into the control line 30 of the pump 18 (FIG. 2). The device for discharging the water which is arranged in the common structural unit 40 at the bottom of the tank 15 (FIG. 2) contains also a heating rod 32 which is supplied with electricity via the electric control 31 of the pump 18 by means of a switching line 34. The heating device 32 can be switched on and off by means of the control unit 31. As for the present example of an embodiment, an automatic switching-on and switching-off of the heating device 32 is provided by a bimetallic switch 39. When using PTC elements such a switch is not necessary.

The structural unit 40 of the device for discharging the water comprises a level sensor 36 which consists basically of two sensors 37, 38 positioned at geodetically different heights. The sensors 37, 38 are supplied with electricity by the control unit 31. As soon as the upper sensor 37 which is located at a larger distance from the bottom of the tank 15 is in contact with water, thus detecting a high liquid level in the tank 15, the control unit 31 receives an impulse to activate the pump 18 for discharging the water from the tank when the internal combustion engine stops. The deactivation of the pump 18 is caused by the lower sensor 38 which is connected electrically with the pump 18 via a signal line 35 and which— in case of contact with the fuel floating on the water— switches off the pump 18 automatically. As an alternative, the signal line 35 of the lower sensor 38 can be connected with the input side of the control unit 31 which switches the pump off when a corresponding measurement signal is coming in.

As an alternative to the embodiment of the level sensor 36 with two sensors positioned at different heights it is also possible to use a float switch which activates the pump 18 if the water level in the tank 15 is high and which ensures that the pump is switched off when the water level has dropped. In this case, the sensors 37, 38 detect reliably the phase boundary between fuel and water in the tank and avoid reliably that the fuel leaks from the tank, for the pump switches off in any case before it aspirates fuel.

An example of the filter screen is described hereafter: The filter screen consists of polyamide PA6 or PA6.6; PA6.10, PA11 or PA12. The impregnation of this filter screen features hydrophobic properties and is obtained for example by a Teflon coating. The mesh opening is in the range from 5 to 100 µm, preferably 20 to 30 µm. The fiber diameter is in the range from 25 to 50 µm, preferably at 30 µm. The area weight of the filter screen is between 20 to 70 µm. The burst pressure is over 4 bar.

The invention claimed is:

1. Fuel filter (1) with a device separating water from fuel, the device comprising
    a filter housing (2),
    a filter element (3) arranged in the filter housing (2), the filter element (3) for the filtration of particles from the fuel,
    at least one filter screen element (6) arranged in the filter housing (2) with the at least one filter screen element (6) arranged downstream of the filter element (3), and
    with a tank (15) located under the filter screen element (6) at the filter housing (2) in which droplets of the separated water are collected, and
    with a deviation device for deviating fuel flow from a downwards flow to an upwards flow, the deviation device positioned between the filter element (3) and the filter screen element (6), the deviation device including
    a housing insert (7) having an opening (10) at a lower end of the housing insert (7), the opening (10) located in at a lower position in the filter housing (2) than the filter element (3), the housing insert (7) and the filter screen element (6) forming a chamber (8) therebetween, the chamber (8) closed at its upper end, the chamber open at the opening (10),
    wherein the fuel flow from the filter element (3) is guided downwards in the filter housing (2) along a radial outside of the housing insert (7) in a direction towards the tank (15), the fuel flow then guided upwards into the chamber (8) through the opening (10), the flow direction deviation operative to separate emulsified water from the fuel flow.

2. Fuel filter according to claim 1, characterized in that the device for the deviation comprises a housing insert (7) which features in its lower part at least one opening (10) which is located in a lower position in the filter housing than the filter element (3).

3. Fuel filter according to claim 2, characterized in that the filter screen element (6) is basically made in a sleeve-shaped design while the housing insert (7) is tubular, wherein the chamber is an annular chamber (8) being formed between filter screen element (6) and housing insert (7) which is closed at its upper end.

4. Fuel filter according to claim 1, characterized in that the filter screen element (6) comprises two units, one of them separating the water as droplets and the other being air-permeable.

5. Fuel filter according to claim 1, characterized in that the filter screen element (6) consists of hydrophobic material having a mesh opening of between 5 µm and 500 µm.

6. Fuel filter according to claim 5, characterized in that the material is a polyamide.

7. Fuel filter according to claim 1, characterized in that guide plates for the descending water droplets are located in the lower area of the filter housing (2).

8. Fuel filter (1) with a device separating water from fuel, the device comprising
    a filter housing (2),
    a filter element (3) arranged in the filter housing (2), the filter element (3) for the filtration of particles from the fuel,
    at least one filter screen element (6) arranged in the filter housing (2) with the at least one filter screen element (6) arranged downstream of the filter element (3), and
    with a tank (15) located under the filter screen element (6) at the filter housing (2) in which droplets of the separated water are collected,
    characterized in that a pump (18) that can be switched on as needed, and a non-return valve (19) located downstream the pump in the flow direction are positioned in the tank (15), the non-return valve (19) having a specified opening pressure, the non-return valve (19) comprising a valve shutoff element (22) activated by the delivery pressure of the pump (18).

9. Fuel filter according to claim 8, characterized in that the pump (18) is switchable depending on a level sensor (36) for detecting the water level in the tank (15).

10. Fuel filter according to claim 8, characterized in that the valve shutoff element (22) is a diaphragm clamped at its edge, the medium section of which is closed by a channel.

11. Fuel filter according to claim 8, characterized in that the valve (19) and the pump (18) are combined to one structural unit (40).

12. Fuel filter according to claim 9, characterized in that the level sensor (36) comprises two sensors (37, 38) positioned at different heights in the tank (15).

13. Fuel filter according to claim 8, characterized in that a heating device (32) is positioned in the tank with the pump (18).

14. Fuel filter according to claim 8, characterized in that the valve is set to an opening pressure from 1 bar to 3 bar.

15. Fuel filter (1) with a device separating water from fuel, the device comprising
    a filter housing (2),
    a filter element (3) arranged in the filter housing (2), the filter element (3) for the filtration of particles from the fuel,
    at least one filter screen element (6) arranged in the filter housing (2) with the at least one filter screen element (6) arranged downstream of the filter element (3), and with a tank (15) located under the filter screen element (6) at the filter housing (2) in which droplets of the separated water are collected, and with a deviation device for deviating the fuel between the filter element (3) and the filter screen element (6), characterized in that the tank (15) is provided with an outlet (21) connected to a catchment chamber (24) which contains a substance that stores liquid, said catchment chamber (24) including at least sectionally a permeable wall (26).

16. Fuel filter according to claim 15, characterized in that the wall (26) is made of fleece.

17. Fuel filter according to claim 15, characterized in that the permeable wall (26) separates the catchment chamber (24) from a collecting chamber (27), the collecting chamber (27) being made of an impermeable material and having a drain hole (28) openable to discharge water from the collecting chamber (27).

18. Fuel filter according to claim 15, characterized in that a filling (25) of absorbent solids is used as liquid-storing substance.

19. Fuel filter according to claim 18, characterized in that the liquid-storing substance (25) is a hydrocarbon-absorbing medium including any of activated carbon or aluminum oxide.

20. Fuel filter according claim 18, characterized in that the quantity of the filling (25) is harmonized with the delivery rate of one work operation of the pump (18).

21. A fuel filter (1) with a separation device separating water from fuel, the separating device comprising:
   a filter housing (2);
   a filter element (3) for the filtration of particles from the fuel;
   at least one sleeve-shaped filter screen element (6) positioned in said filter housing (2), said screen element located downstream said filter element (3), said filter screen element including a polyamide hydrophobic material having a mesh opening of between 5 μm and 500 μm;
   at least one guide plate for guiding descending water droplets positioned in a lower area of the filter housing (2);
   a tank (15) positioned under said filter screen element (6) at said filter housing (2) in which droplets of the separated water are collected, said tank including an outlet (21) connected to a catchment chamber (24) which contains liquid absorbent solids (25), said catchment chamber (24) including at least sectionally a permeable fleece wall (26);
   a collecting chamber (27) having an outlet opening (28) configured to be selectively openable as needed, said collecting chamber separated from said catchment chamber (24) by said permeable fleece wall (26);
   a pump (18) positioned in said tank
   a level sensor (36) for detecting the water level in the tank (15) and actuating said pump;
   a non-return valve (19) positioned in said tank and in fluid communication with an outlet of said pump, said non-return valve having a predefined opening pressure, said valve including
      a valve shutoff element (22) activated by delivery pressure of the pump (18), said non-return valve further having a diaphragm clamped at its edge, a central section of which is closed by a channel; and
   a flow direction deviation device for deviating fuel flow from a downwards flow to an upwards flow, said deviation device positioned between said filter element (3) and said filter screen element (6), said deviation device including
      a tubular housing insert (7) housing insert having at least one opening (10) at a lower end of said tubular housing insert (7), said opening (10) located in a lower position in the filter housing than said filter element (3), said housing insert and said screen element forming an annular chamber (8) therebetween, said annular chamber closed at its upper end;
wherein said liquid absorbent solids (25) is a hydrocarbon-absorbing medium including any of activated carbon, aluminum oxide.

\* \* \* \* \*